(12) United States Patent
Jiang

(10) Patent No.: US 9,806,578 B2
(45) Date of Patent: Oct. 31, 2017

(54) WIRE TERMINAL JOINT OF MOTOR STATOR WINDING

(71) Applicant: Zhongshan Broad-Ocean Motor Manufacturing Co., Ltd., Zhongshan (CN)

(72) Inventor: Zeyan Jiang, Zhongshan (CN)

(73) Assignee: ZHONGSHAN BROAD-OCEAN MOTOR MANUFACTURING CO., LTD., Zhongshan (CN)

( * ) Notice: Subject to any disclaimer, the term of this patent is extended or adjusted under 35 U.S.C. 154(b) by 267 days.

(21) Appl. No.: 14/840,039

(22) Filed: Aug. 30, 2015

(65) Prior Publication Data

US 2015/0372555 A1     Dec. 24, 2015

Related U.S. Application Data

(63) Continuation-in-part of application No. PCT/CN2014/073537, filed on Mar. 17, 2014.

(30) Foreign Application Priority Data

Jan. 3, 2014   (CN) .................... 2014 2 0006501 U

(51) Int. Cl.
*H02K 3/50* (2006.01)
*H02K 3/52* (2006.01)
*H02K 3/02* (2006.01)
*H02K 3/04* (2006.01)

(52) U.S. Cl.
CPC ................. *H02K 3/50* (2013.01); *H02K 3/02* (2013.01); *H02K 3/04* (2013.01); *H02K 3/52* (2013.01); *H02K 3/521* (2013.01); *H02K 3/522* (2013.01)

(58) Field of Classification Search
CPC  H02K 3/50; H02K 3/52; H02K 3/521–3/528; H02K 5/225; H01F 5/04; H01F 41/10
USPC ............................................. 310/71; 336/192
See application file for complete search history.

(56) References Cited

U.S. PATENT DOCUMENTS 3,488,431 A * 1/1970 Nixon .................. H01B 7/0009
                                                  174/70 R
4,602,424 A * 7/1986 Kindig ..................... H02K 3/38
                                                  29/596

* cited by examiner

*Primary Examiner* — Ramon M Barrera
(74) *Attorney, Agent, or Firm* — Matthias Scholl P.C.; Matthias Scholl

(57) ABSTRACT

A wire terminal joint of a motor stator winding, including: an external power wire, the external power wire including a core extending from one end thereof; a plurality of aluminum-enameled wires, each aluminum-enameled wire including an exposed aluminum wire at one end thereof; a first sleeve; and a second sleeve. The aluminum-enameled wires are disposed on the motor stator winding. The core extending from one end of the external power wire is interwound with and electrically connected to the exposed aluminum wire. The first sleeve has a larger diameter than the second sleeve. The second sleeve is sleeved on the core and the exposed aluminum wire. One end of the first sleeve is sleeved on external surfaces of the external power wire and the exposed aluminum wire, and another end of the first sleeve is sleeved on an external surface of the second sleeve.

7 Claims, 4 Drawing Sheets

WIRE TERMINAL JOINT OF MOTOR STATOR WINDING

CROSS-REFERENCE TO RELATED APPLICATIONS

This application is a continuation-in-part of International Patent Application No. PCT/CN2014/073537 with an international filing date of Mar. 17, 2014, designating the United States, now pending, and further claims priority benefits to Chinese Patent Application No. 201420006501.6 filed Jan. 3, 2014. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

This invention relates to a wire terminal joint of a motor stator winding.

Description of the Related Art

Typically, the aluminum-enameled wire and the external power wire of a motor stator winding are electrically connected by soldering or crimping, and then a heat-shrinkable tube is employed to seal and protect the wire terminal. However, the heat-shrinkable tube tends to shrink upon thermal treatment. This produces large gaps in the wire terminal, resulting in poor sealing and shorter service life of the motor.

SUMMARY OF THE INVENTION

In view of the above-described problems, it is one objective of the invention to provide a wire terminal joint of a motor stator winding which features compact structure, good sealing property, high reliability, and long service life.

To achieve the above objective, in accordance with one embodiment of the invention, there is provided a wire terminal joint of a motor stator winding, comprising: an external power wire, the external power wire comprising a core extending from one end thereof; a plurality of aluminum-enameled wires, one end of each aluminum-enameled wire comprising an exposed aluminum wire; a first sleeve; and a second sleeve. The aluminum-enameled wires are disposed on the motor stator winding. The core extending from one end of the external power wire is interwound with and electrically connected to the exposed aluminum wire. The first sleeve has a larger diameter than the second sleeve. The second sleeve is sleeved on the core and the exposed aluminum wire; one end of the first sleeve is sleeved on external surfaces of the external power wire and the exposed aluminum wire, and another end of the first sleeve is sleeved on an external surface of the second sleeve.

In a class of this embodiment, the first sleeve is sleeved on the external surfaces of the external power wire and the second sleeve, and is thermally-bonded the second sleeve.

In a class of this embodiment, the core extending from one end of the external power wire is interwound with and soldered to the exposed aluminum wire.

In a class of this embodiment, the core extending from one end of the external power wire is interwound and riveted with the exposed aluminum wire.

In a class of this embodiment, one end of the second sleeve is sealed.

Compared with existing technologies, advantages of the wire terminal joint of a motor stator winding according to embodiments of the invention are given below.

1. An aluminum-enameled wire terminal is an exposed aluminum wire; a core extending from an end of the external power wire is interwound with and electrically connected to the exposed aluminum wire. The wire terminal joint further comprises a first sleeve and a second sleeve. The second sleeve is sleeved on the external surfaces of the core and the exposed aluminum wire; and one end of the first sleeve is sleeved on the external surfaces of the external power wire and the aluminum wire, and the other end of the first sleeve is sleeved on the external surface of the second sleeve. This wire terminal joint features compact structure, easy operation, high reliability and long service life, and can effectively solve the poor sealing problem of the wire terminals of the existing aluminum-enameled wires and external power wires.

2. The first sleeve is sleeved on the external surfaces of the external power wire and the second sleeve, and is thermally-bonded the second sleeve, facilitating the formation of a compact structure and thus improving the sealing property of the wire terminal.

3. The core extending from the end of the external power wire is interwound with and riveted on or soldered to the exposed aluminum wire, facilitating the formation of a compact structure and a reliable connection.

4. One end of the second sleeve is sealed, facilitating a good sealing property and high reliability.

DETAILED DESCRIPTION OF THE EMBODIMENTS

For further illustrating the invention, experiments detailing a wire terminal joint of a motor stator winding are described below. It should be noted that the following examples are intended to describe and not to limit the invention.

Figure 1:
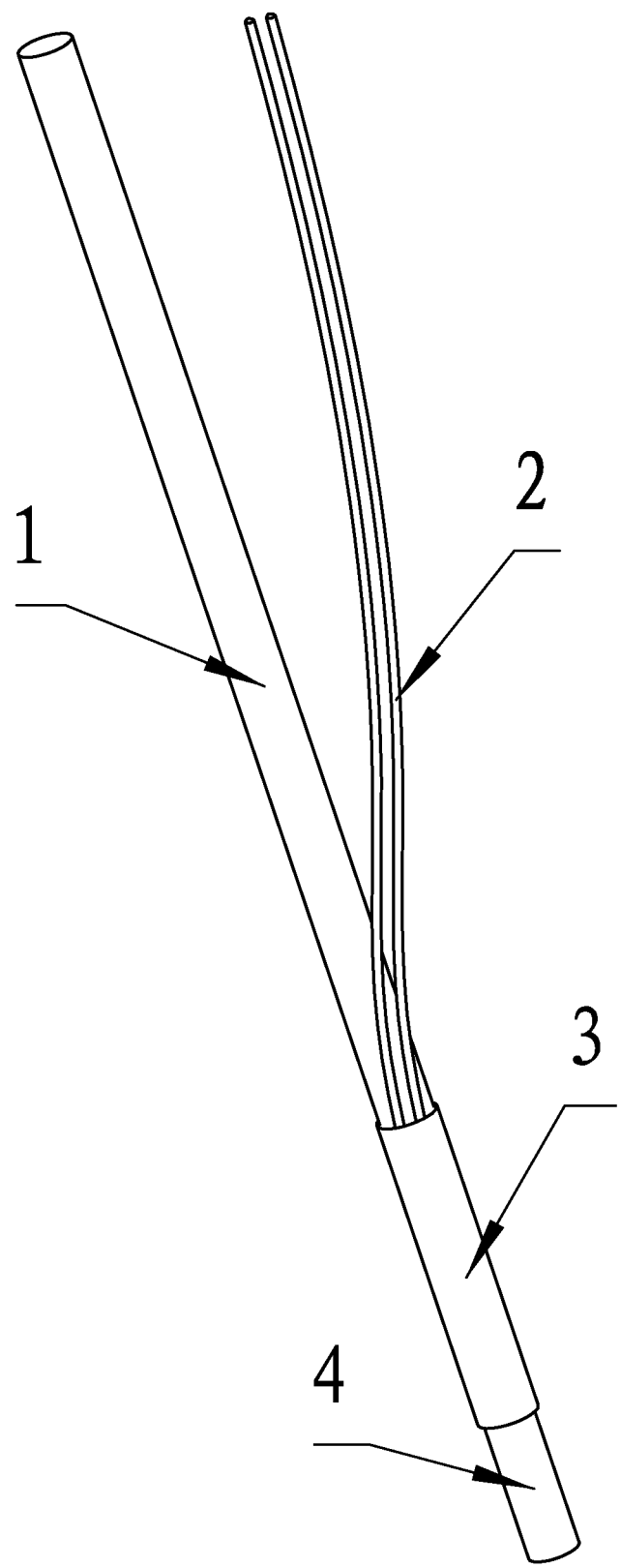
FIG. 1 is a stereogram of a wire terminal joint of a motor stator winding in accordance with one exemplary embodiment of the invention.
Figure 2:
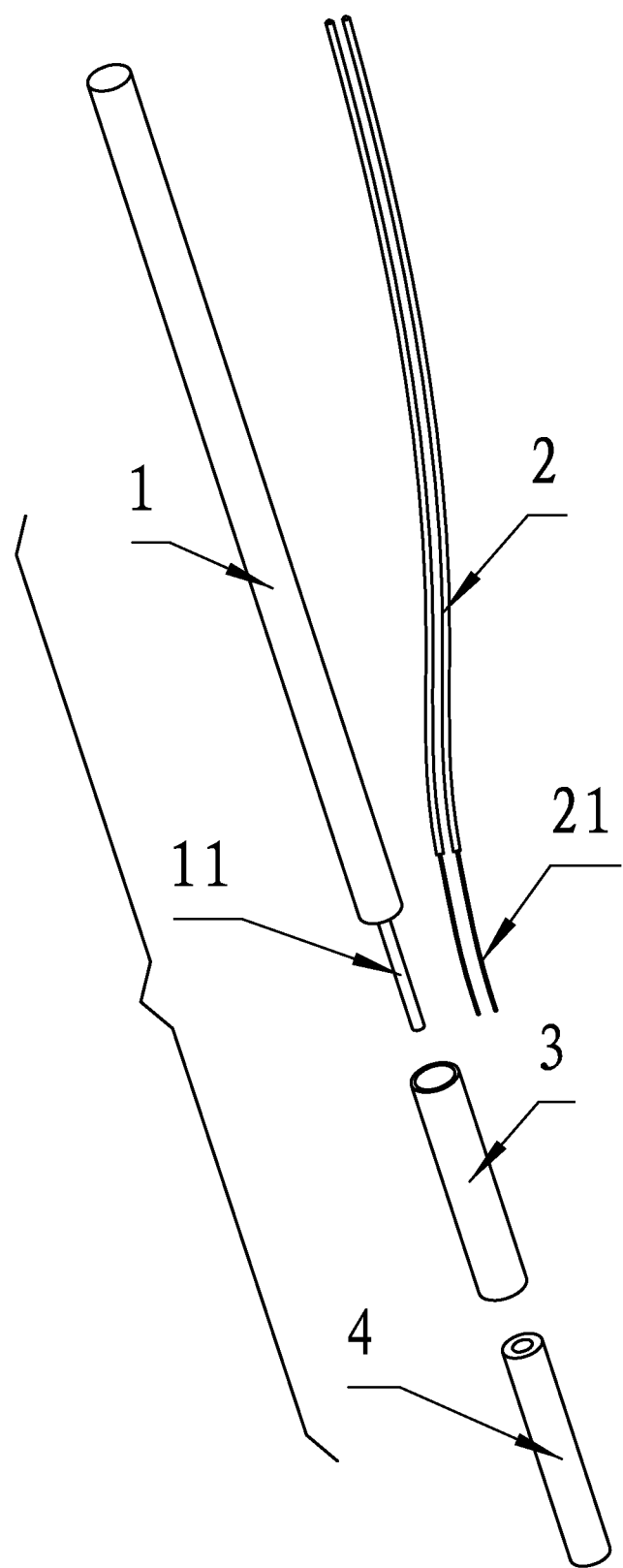
FIG. 2 is an exploded view of a wire terminal joint of a motor stator winding in accordance with one exemplary embodiment of the invention.
Figure 3:
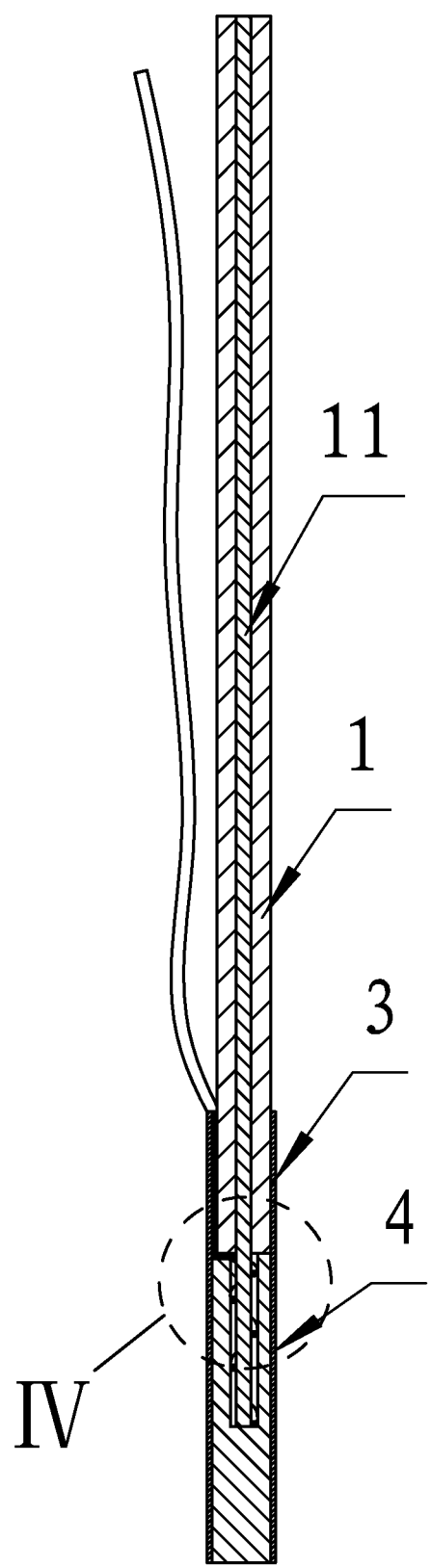
FIG. 3 is a cross-sectional view of a wire terminal joint of a motor stator winding in accordance with one exemplary embodiment of the invention.
Figure 4:
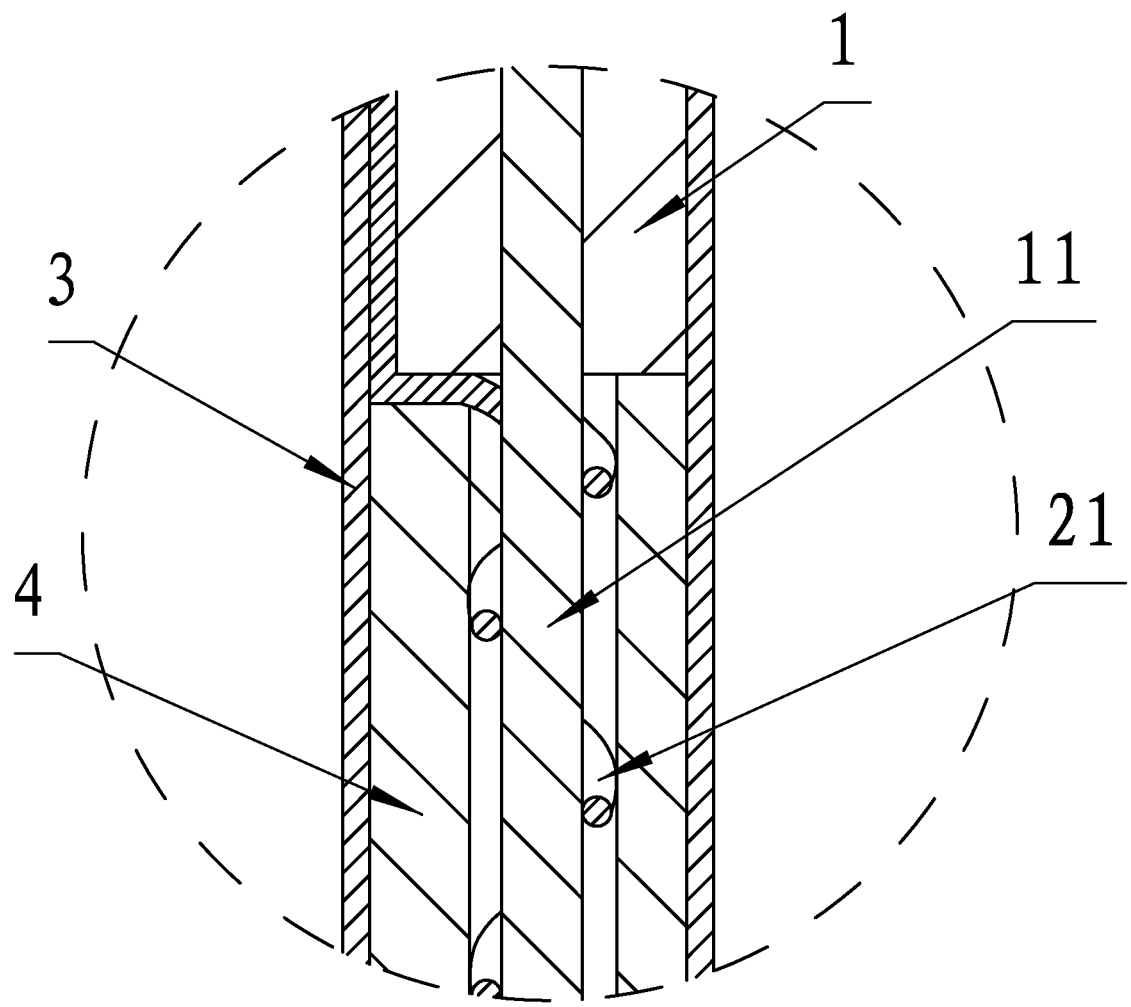
FIG. 4 is a local enlarged view of part IV in FIG. 3 in accordance with one exemplary embodiment of the invention.

As shown in FIGS. 1-4, a wire terminal joint of a motor stator winding, comprises: an external power wire 1, a plurality of aluminum-enameled wires 2 disposed on the motor stator winding, a first sleeve 3, and a second sleeve 4. The external power wire 1 comprises a core 11 extending from one end thereof. Each aluminum-enameled wire 2 comprises an exposed aluminum wire 21 at one end thereof.

The core 11 extending from an end of the external power wire 1 is interwound with and electrically connected to the exposed aluminum wire 21. The first sleeve has a larger diameter than the second sleeve. The second sleeve 4 is sleeved on the core 11 and the exposed aluminum wire 21;

and one end of the first sleeve 3 is sleeved on the external surfaces of the external power wire 1 and the aluminum wire 21, and the other end of the first sleeve is sleeved on the external surface of the second sleeve 4.

The first sleeve 3 is sleeved on the external surface of the external power wire 1 and the second sleeve 4, and is thermally-bonded to the second sleeve 4.

The core 11 extending from the end of the external power wire 1 is interwound with and soldered to the exposed aluminum wire 21.

The core 11 extending from the end of the external power wire 1 is interwound and riveted with the exposed aluminum wire 21.

One end of the second sleeve 4 is closed.

Principles of the wire terminal joint of a motor stator winding is summarize as follows. The core 11 extending from the end of the external power wire 1 is interwound with and electrically connected to the exposed aluminum wire 21. The second sleeve 4 is sleeved on the external surfaces of the core 11 and the exposed aluminum wire 21. One end of the first sleeve 3 is sleeved on the external surfaces of the external power wire 1 and the aluminum wire 21, and the other end of the first sleeve is sleeved on the external surface of the second sleeve 4. The first sleeve 3 is sleeved on the external surfaces of the external power wire 1 and the second sleeve 4, and is thermally-bonded to the second sleeve 4. The wire terminal joint features a compact structure, easy operation, good sealing property, high reliability and a long service life.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A wire terminal joint of a motor stator winding, comprising:
   a) an external power wire, the external power wire comprising a core extending from one end thereof;
   b) a plurality of aluminum-enameled wires, one end of each aluminum-enameled wire being an exposed aluminum wire;
   c) a first sleeve; and
   d) a second sleeve;
   wherein
   the aluminum-enameled wires are disposed on the motor stator winding;
   the core extending from one end of the external power wire is interwound with and electrically connected to the exposed aluminum wire; and
   the first sleeve has a larger diameter than the second sleeve; the second sleeve is sleeved on the core and the exposed aluminum wire; one end of the first sleeve is sleeved on external surfaces of the external power wire and the exposed aluminum wire, and another end of the first sleeve is sleeved on an external surface of the second sleeve.

2. The wire terminal joint of claim 1, wherein the first sleeve sleeved on the external surfaces of the external power wire and the second sleeve is thermally-bonded to the second sleeve.

3. The wire terminal joint of claim 1, wherein the core extending from one end of the external power wire is interwound with and soldered to the exposed aluminum wire.

4. The wire terminal joint of claim 2, wherein the core extending from one end of the external power wire is interwound with and soldered to the exposed aluminum wire.

5. The wire terminal joint of claim 1, wherein the core extending from one end of the external power wire is interwound with and riveted to the exposed aluminum wire.

6. The wire terminal joint of claim 2, wherein the core extending from one end of the external power wire is interwound with and riveted to the exposed aluminum wire.

7. The wire terminal joint of claim 2, wherein one end of the second sleeve is sealed.

* * * * *